US010291494B2

(12) United States Patent
Nedeltchev et al.

(10) Patent No.: US 10,291,494 B2
(45) Date of Patent: May 14, 2019

(54) DISTRIBUTING DATA ANALYTICS IN A HIERARCHICAL NETWORK BASED ON COMPUTATIONAL COMPLEXITY

(71) Applicant: Cisco Technology, Inc., San Jose, CA (US)

(72) Inventors: Plamen Nedeltchev, San Jose, CA (US); David A. Maluf, Mountain View, CA (US); David D. Ward, Los Gatos, CA (US); Alon S. Bernstein, Monte Sereno, CA (US)

(73) Assignee: Cisco Technology, Inc., San Jose, CA (US)

( * ) Notice: Subject to any disclaimer, the term of this patent is extended or adjusted under 35 U.S.C. 154(b) by 398 days.

(21) Appl. No.: 15/133,631

(22) Filed: Apr. 20, 2016

(65) Prior Publication Data

US 2017/0310565 A1    Oct. 26, 2017

(51) Int. Cl.
*G06F 15/16*    (2006.01)
*H04L 12/26*    (2006.01)
*H04L 12/24*    (2006.01)

(52) U.S. Cl.
CPC .............. *H04L 43/04* (2013.01); *H04L 41/14* (2013.01)

(58) Field of Classification Search
CPC ................................ H04L 43/04; H04L 41/14
See application file for complete search history.

(56) References Cited

U.S. PATENT DOCUMENTS

| 8,667,138 | B2 | | 3/2014 | Ganesan et al. | |
|---|---|---|---|---|---|
| 9,389,920 | B2 | * | 7/2016 | Zhang | G06F 9/505 |
| 9,684,543 | B1 | * | 6/2017 | Bequet | H05K 999/00 |
| 9,788,017 | B2 | * | 10/2017 | Laganiere | H04L 12/6418 |
| 9,811,575 | B2 | * | 11/2017 | Christian | G06F 17/30569 |
| 9,900,378 | B2 | * | 2/2018 | Zhang | H04L 67/1008 |
| 9,952,908 | B2 | * | 4/2018 | Nedeltchev | G06F 9/5072 |
| 10,002,029 | B1 | * | 6/2018 | Bequet | G06F 9/5083 |
| 10,002,146 | B1 | * | 6/2018 | Bowman | G06F 17/30321 |
| 10,123,051 | B2 | * | 11/2018 | Laganiere | H04L 12/6418 |
| 2011/0109742 | A1 | * | 5/2011 | Laganiere | H04N 7/185 348/143 |
| 2012/0195363 | A1 | * | 8/2012 | Laganiere | H04L 12/6418 375/240.01 |
| 2015/0161755 | A1 | | 6/2015 | Jang | |

(Continued)

*Primary Examiner* — Moustafa M Meky
(74) *Attorney, Agent, or Firm* — Edell, Shapiro & Finnan, LLC

(57) ABSTRACT

A method provided in a network including edge devices to collect data from data producers connected to the edge devices and to communicate with cloud-based prosumers connected with the edge devices. Data analytics tasks are identified. The data analytics tasks are used to process data collected from a data producer among the data producers to produce a result for consumption by one or more of the cloud-based prosumers. For each data analytics task it is determined whether a computational complexity of the data analytics task is less than or equal to a predetermined computational complexity. Each data analytics task determined to have a computational complexity less than or equal to the predetermined computational complexity is assigned to an edge device among the edge devices. Each data analytics task determined to have a computational complexity that exceeds the predetermined computational complexity is assigned to a prosumer among the prosumers.

20 Claims, 7 Drawing Sheets

(56) References Cited

U.S. PATENT DOCUMENTS

2015/0256435 A1  9/2015 Sum et al.
2018/0027260 A1* 1/2018 Laganiere ........... H04L 12/6418
                                                    375/240.01

* cited by examiner

| ANALYTICS TASK NAME / ID | LINK TO TASK | ORDER OF COMPLEXITY | POLICY, RULES, CONDITIONS GOVERNING TASK EXECUTION / COMPUTATION WINDOW |
|---|---|---|---|
| NAME 1 | LINK 1 | $N\log N$ | CONDITION 1 |
| NAME 2 | LINK 2 | $\log N$ | CONDITION 2 |
| NAME 3 | LINK 3 | $N^2$ | CONDITION 3 |
| ⋮ | ⋮ | ⋮ | ⋮ |
| NAME M | LINK M | $N$ | CONDITION M |

DISTRIBUTING DATA ANALYTICS IN A HIERARCHICAL NETWORK BASED ON COMPUTATIONAL COMPLEXITY

TECHNICAL FIELD

The present disclosure relates to distributing data analytics in a network.

BACKGROUND

A network may include large numbers of edge devices at an edge of the network. The edge devices receive raw data from an even larger number of data producers, such as sensors. The network may also include cloud-based servers connected to the edge devices. Data analytics may be performed in the network to examine large amounts of the raw data for purposes of drawing high-level, useful conclusions for consumption by the cloud-based servers. The cloud-based servers have substantially more compute power than the edge devices. The cloud based servers may be located North (as a "public-cloud"), South (as a "home-cloud"), or East-West (as a "hybrid-cloud") of the edge device.

BRIEF DESCRIPTION OF THE DRAWINGS

FIG. 7 is an illustration of a task database in the network of FIG. 1, according to an example embodiment.

DESCRIPTION OF EXAMPLE EMBODIMENTS

Overview

Figure 1:
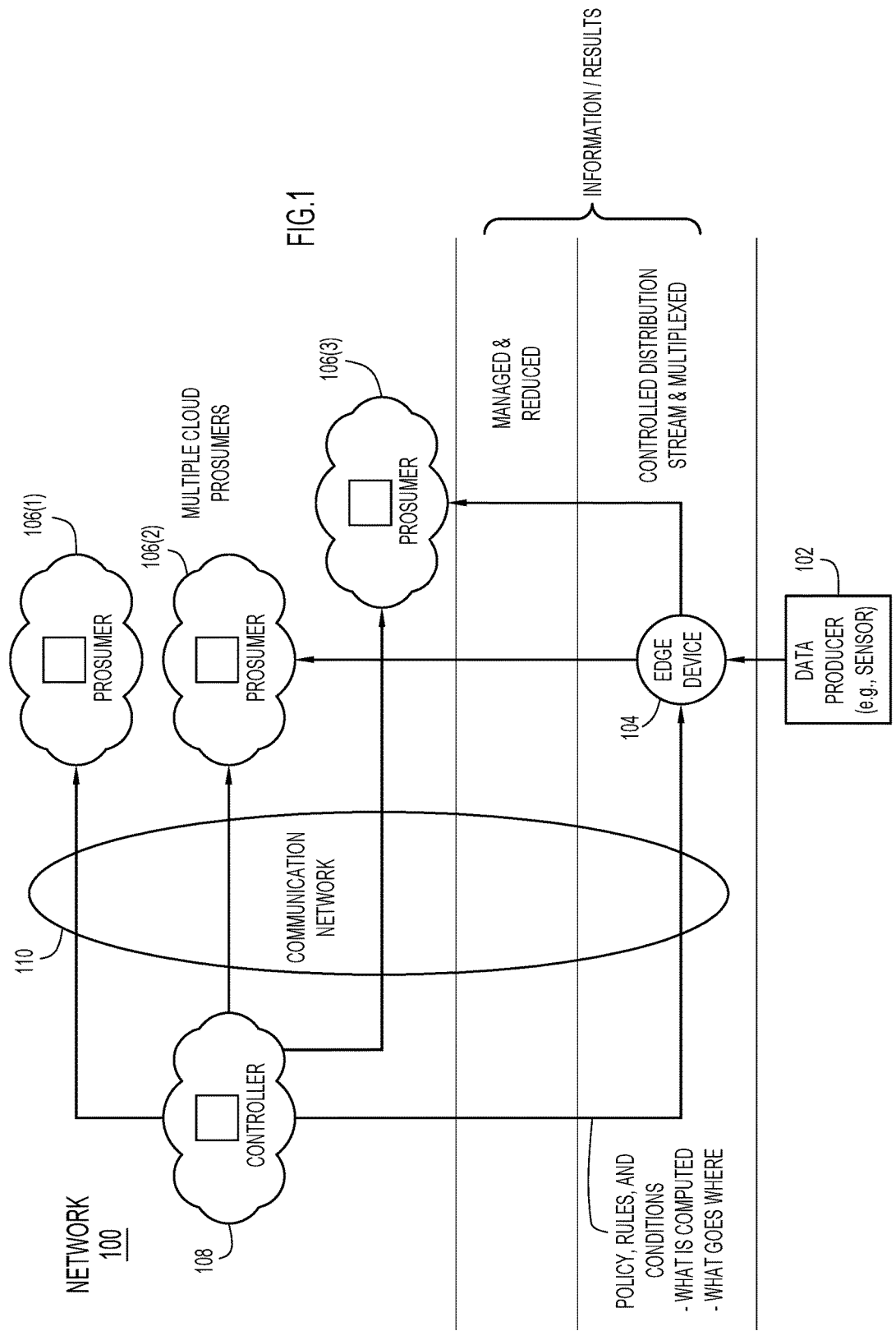
FIG. 1 is a block diagram of a hierarchical network in which data analytics may be implemented, according to an example embodiment.

A method is performed at a network controller in a network including edge devices to collect data from data producers connected to the edge devices and to communicate with cloud-based prosumers connected with the edge devices. Data analytics tasks are identified. The data analytics tasks are used to process data collected from a data producer among the data producers to be consumed by one or more of the cloud-based prosumers. For each data analytics task it is determined whether a computational complexity of the data analytics task is less than or equal to a predetermined computational complexity. Each data analytics task determined to have a computational complexity less than or equal to the predetermined computational complexity is assigned to an edge device among the edge devices. Each data analytics task determined to have a computational complexity that exceeds the predetermined computational complexity is assigned to one or more prosumers among the prosumers.

Detailed Description

Data analytics processes/analyzes low-level or raw data from data producers, such as computer devices and sensor devices, for the purpose of drawing high-level conclusions based on the data. Data analytics examines large amounts of such data to uncover hidden patterns, correlations and other insights. Data analytics may be used in many industries to allow companies and organization to make better business decisions and in the sciences to verify or disprove existing models or theories, for example. There are different types of data analytics tasks or functions to derive correspondingly different types of results from different types of data.

One approach pushes all or most of the data analytics to the cloud-based servers. Disadvantages of this approach are that it ignores the combined computational power of the edge devices, a shelf time of the data may be lower than a time to react to the data, and the amount of data may be "too big" to be sent North to the public-cloud, for example, and to then wait for action based on that data. Another conventional approach attempts to push the data analytics to the edge devices in an unintelligent way, and thus tends to overload the typically "thin" compute capabilities of the edge device with sometimes "computationally expensive" operations and too much data. The different conventional approaches fail to provide effective techniques to determine which data analytics are best computed at which devices in the network.

Data analytics may be performed in a hierarchical network that includes large numbers of data producers (e.g., computers, sensors, and the like) to produce raw data in the Internet-of-Things (IoT), edge devices connected with the data producers and configured to perform edge computing on the data, and cloud-based data centers (i.e., the "cloud") configured to perform cloud computing based on both the data and results of the edge computing. It is advantageous to optimize computational complexity of data analytics across the hierarchical network as data/results traverse or move through the network. The hierarchical topology and distributed processing affords the possibility to perform certain data analytics starting at the edge device and terminating in the cloud.

At least three modalities of preforming data analytics in the hierarchical network may be used. In a first approach, all data from the data producers is sent to the cloud where all data analytics are performed in a manner that is totally opaque to the rest of the network, presuming network communication bandwidth prevails for all of the data to be sent to the cloud. In a second approach, all data is analyzed at the edge devices provided there is sufficient compute power at the edge devices to process and sustain the data analytics and its outcomes. A third approach, implemented in embodiments presented herein, represents a hybrid of the first and second approaches. In the third approach, the cloud becomes a prosumer of the edge devices, and the edge devices becomes prosumers of the cloud in that the edge devices may refine their analysis techniques to suit the needs of the cloud based on feedback from the cloud. A "prosumer" is an entity, including a device and/or a service hosted on a device, that both consumes and produces data and/or results.

The hybrid approach pushes data analytics of relatively low complexity or computationally "thin" tasks to the edge devices so that data analytics of relatively high complexity may be implemented at a later stage, for example, in the cloud. Thus, as data and results flow from the edge devices to the cloud, the data analytics (and associated results) become increasingly more complex. Embodiments presented herein abstract the data analytics so as to focus on answering the questions of what data analytics are achieved at the edge devices vs. what data analytics are achieved at the cloud, i.e., "what to compute where." A goal of the abstraction is to produce an efficient outcome as "global edge-and-cloud analytics."

The embodiments presented herein optimize the nature of data analytics for the IoT without increasing the Total Cost of Ownership (TCO) for edge devices, with the intent to exceed the performance achieved by implementing traditional data analytics pushed to the edge device. Traditionally, increasing the complexity of data analytics at the edge devices requires increasing compute capabilities at the edge devices and correspondingly increasing cost of the edge devices. Since the proliferation in the numbers of edge devices is in the millions, a goal of the embodiments presented herein is to push as much data analytics as possible to the edge devices and therefore closer to the source of the data producer based on the complexity of the data analytics so as to keep the cost of the edge devices as low as possible.

These embodiments use a "divide-and-conquer" approach that divides data analytics between the edge devices and the cloud based on the complexity of the data analytics and the associated flow of data. The data analytics are divided from low complexity to high complexity from the edge device to the cloud, respectively, as will be described more fully below.

With reference to FIG. 1, there is shown a block diagram of an example hierarchical network 100 in which the above-mentioned hybrid approach to implementing data analytics may be implemented. Hierarchical network 100 includes a data producer 102, a network edge device 104 (referred to simply as an "edge device" 104) connected with the data producer, multiple cloud-based prosumers 106(1)-106(3) (referred to collectively as "prosumers" 106), and a network controller 108 to control implementing data analytics in network 100 in accordance with embodiments described herein. Edge device 104, prosumers 106, and controller 108 may be connected to or reside in, and communicate with each other via, a communication network 110. Communication network 110 may include one or more wide area networks (WANs), such as the Internet, and one or more local area networks (LANs). Communications between edge device 104, prosumers 106, and controller 108 over communication network 110 may use any known or hereafter developed communication protocols, such as the Internet Protocol (IP), and the like. The network depicted in FIG. 1 is presented by way of example only and it is understood that a hierarchical network that operates in accordance with the embodiments described herein will typically include many data producers, many edge devices connected with the data producers, and many prosumers connected with the edge devices.

Data producer 102 may be any device that generates data for consumption or processing by edge device 104 and/or prosumers 106, and on which data analytics in the edge device and the prosumers may be performed. Examples of data producer 102 include, but are not limited to, a computer device that produces data or a sensor that produces sensor data, such as an Internet-of-Things (IoT) device/sensor, a temperature sensor, a power sensor, a light sensor, a still/video camera that generates audio and/or video data, a location sensor, and automotive sensor, and so on. Data producer 102 may produce its data in any form, such as a stream of spaced-apart data samples (e.g., data bytes or data words), sequential blocks of data (or data samples) delimited by block delimiters, computer files, and so on.

Cloud-based prosumers 106 may include, for example, cloud-based application programs (referred to simply as "applications") hosted on servers located in data centers or on customer (e.g., corporate) premises, and which are generally accessible to edge device 104 via communication network 110. Under control of network controller 108, prosumers 106 implement data analytics that consume, analyze, and produce data/information. Prosumers 106 employ the data analytics to derive information useful for high-level decision making based on data from producer 102 and results derived by edge device 104 based on the data.

Edge device 104 may be a network router (e.g., gateway device), switch, or the like, situated at an edge of communication network 110 between prosumers 106 and data producer 102. Edge device 104 routes data to/from prosumers 106 and to/from data producer 102. Under control of network controller 108, edge device 104 may perform data analytics based on data from data producer 102 to derive information for prosumers 106.

Network controller 108 may be any network device connected with communication network 108. Network controller 108 may be a stand-alone computer device, distributed across network 100, and/or integrated with one or more of prosumers 106 or edge device 104. Network controller 108 (referred to simply as "controller" 108) controls the manner in which data analytics are distributed and implemented in network environment 100. As mentioned above, data analytics includes many different types of data analytic tasks. According to embodiments presented herein, controller 108 identifies separable data analytics tasks. The data analytics tasks may be stand-alone tasks, or may be part of a set of tasks that operate together/collectively, e.g., in parallel, or serially, to achieve multiple results that feed into a higher-level result. Controller 108 determines respective computational complexities of the data analytics tasks (referred to simply as "tasks"), and distributes the tasks across, i.e., assigns the tasks to, prosumers 106 or edge device 104 based on their computational complexities.

Because prosumers 106 typically have substantially more compute power than edge device 104, controller 108 assigns to edge device 104 the tasks determined to have relatively low computational complexities and assigns to prosumers 106 the tasks determined to have relatively high computational complexities that are greater than the low computational complexities. As will be described below, controller 108 may assign to edge device 104 "approximately linear" tasks each having an "approximately linear" computational complexity and assign to prosumers 106 "non-linear" tasks each having a "non-linear" computational complexity greater than the approximately linear computational complexity.

As used herein, (i) the term "approximately linear" complexity means a computational complexity less than or equal to an order of complexity $O(N\log N)$, where N is a size of the problem solved, and (ii) the term "non-linear" complexity means a computational complexity that exceeds $O(N\log N)$. The Big-O notation for order of (computational) complexity used above (e.g., $O(N\log N)$) is a mathematical notation that describes the limiting behavior of an analytics function when N tends towards a particular value or infinity. The Big-O notation, also referred to as "Landau's symbol," is a member of a family of notations collectively called Bachmann-Landau notation or asymptotic notation. The "N" term may represent a number of computational steps, a number of values operated on by the given task, a number of elements in an array that is searched by the task, and so on.

According to embodiments presented herein, controller 108 may decompose a total computational complexity of a given data analytics task into computational complexities of its constituent analytics parts, as follows:

Total computational complexity=approximately linear complexity+non-linear complexity, where "approximately linear complexity" is O(NlogN) and below, and "non-linear complexity" exceeds O(NlogN).

Listed below are various (computational) tasks and their associated orders of computational complexity:
 a. Bubble and Insertion sorts—O(N) (i.e., linear);
 b. Selection sort—$O(N^2)$ (i.e., non-linear);
 c. Merge and Quick Sort—O(NlogN) (i.e., approximately linear);
 d. Data transformations (binary to ASCII)—O(N);
 e. Parsing operations on XML, JSON, JPEG, and file unzip operations—O(N);
 f. Filtering/searching based on an index used as a look-up table—O(NlogN), e.g., filtering on OSI layer (L) 2 (e.g., Mac Address), filtering on L3-L6, filtering on L7 of sensor level data (e.g., "temperature >10 and pressure range between 20 and 30"); and
 g. Numerical Analysis—O(NlogN), e.g., finding Min/Max in a data set, regression analysis, histogram analysis, and filtering of/matching to N signatures.

Any tasks having a computation complexity equal to or below O(Nlog(N)), such as those listed above having such complexity, may be performed at edge device 104. Typically, O(Nlog(N)) reflects the complexity of an indexer to build an index, while a pattern match has complexity O(log (N)).

In addition to assigning tasks based on computational complexity as described above, for each task assigned to edge device 104, controller 108 determines an elastic compute window that defines a sufficient amount of data (to be collected from the data producer) to be processed by the task, each time the task is executed by the edge device, to ensure that the task generates useful results/information based on that amount of data. The computation window is "elastic" because a length of the computation window may vary over time depending on various conditions, as described below.

The compute window is generally defined as an acceptable time window over which data (e.g., data samples) are collected before being processed by a task. Typically, the compute window may be set by a size S of a buffer in edge device 104 for storing the data, or a period of time T. Embodiments herein extend the window elastically (i.e., variably) beyond the time period T or the buffer size S to ensure a minimum amount of data, needed by the task to compute a meaningful/useful/valid result based on that data, is collected. In other words, the elastic compute window acts like sliding window and ensures there is enough data collected for the task to transform the data into valid information. In addition to the time period T and the buffer size S, the transformation of data to valid information may require other constraints on the collection of the data that cause variability in the size of the compute window.

If a data producer produces data formatted as blocks or segments of data delimited by block/segment delimiters, and all of the data within each block or segment up to the occurrence of the delimiter is required for a valid transformation of the data by the task, then a requirement to wait for the delimiter before closing the compute window becomes an additional constraint on collecting the data. In a complex data example, such as a compressed video image stream (e.g., Joint Photographic Experts Group (JPEG) stream) including blocks of data each delimited by a data end-of-block, the data end-of-block is a crucial terminating point for achieving a valid data-to-information transformation. In other words, the computation window must be extended to collect all data up to the data end-of-block. Thus, in cases where the data includes delimiters, such as end-of-block, commas, and the like, the computation window is defined as an algebraic function over multiple computation window conditions, including but not limited to, period T, buffer size S, and wait for (data) end-of-block.

Figure 2:
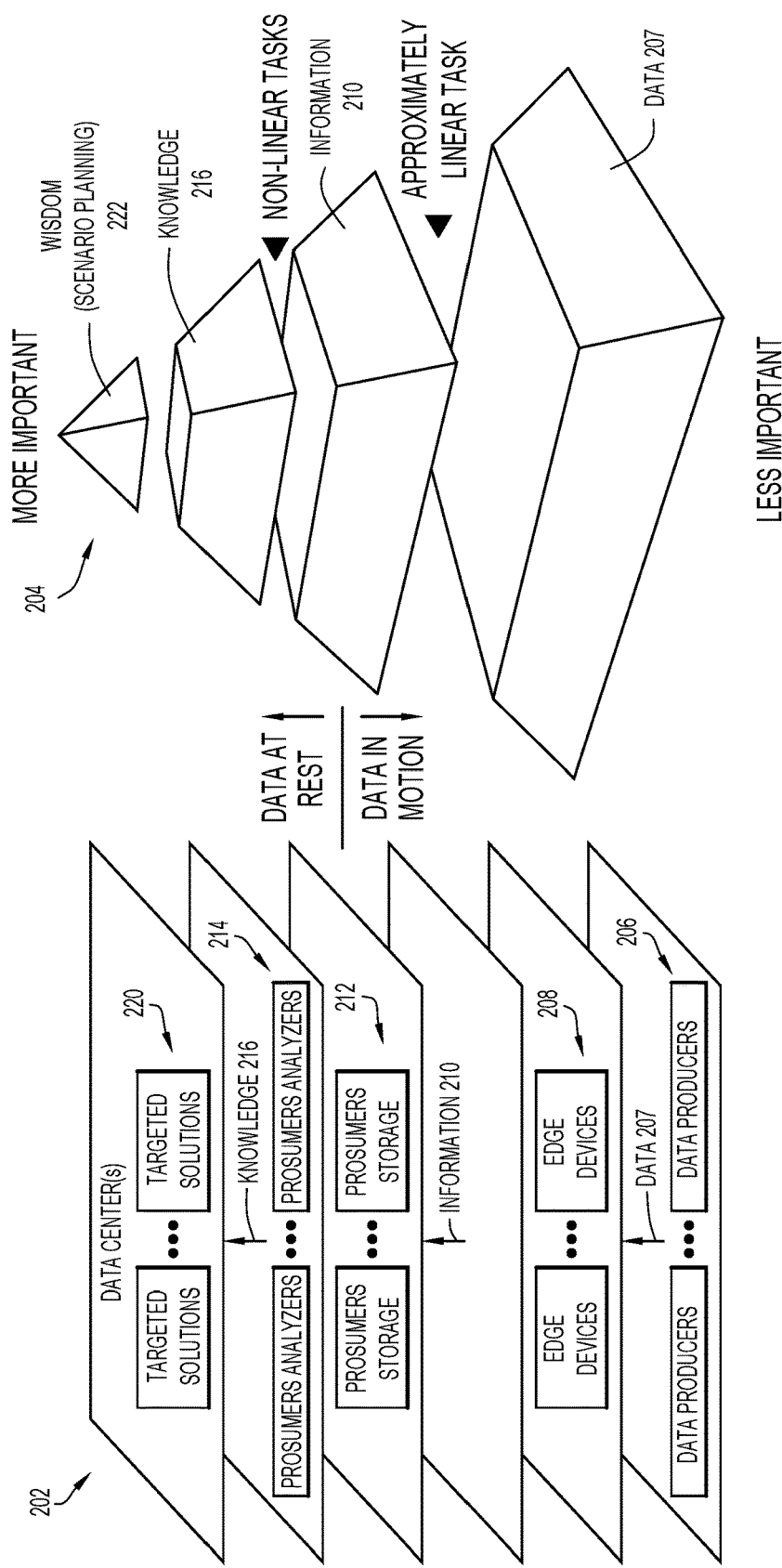
FIG. 2 is an illustration of a hierarchical network in which different data analytics tasks are distributed across different levels of the network, and of a hierarchical data model corresponding to the different levels of the hierarchical network, according to an example embodiment.

With reference to FIG. 2, there is an illustration of a hierarchical network 202 (on the left-hand side of FIG. 2) in which approximately linear tasks and non-linear tasks are distributed across different levels of the network, and a hierarchical data model 204 (on the right-hand side of FIG. 2) that shows different data/data analytics results corresponding to the different levels of the hierarchical network. Hierarchical network 202 is described in a direction from a lowest (i.e., bottom) level to a highest (i.e., top) level of the network. Data producers 206 send data 207 to edge devices 208. Data producers 206 and edge devices 208 may include data producer 102 and edge device 104 from FIG. 1, respectively. Edge devices 208 execute approximately linear tasks (collectively referred to as "edge analytics") based on data 207, to produce results/information 210. Information 210 flows to storage prosumers 212 for storage, and to analysis prosumers 214 that analyze the information. Prosumers 212 and 214 may be hosted in a data center, for example, and may include prosumers 106 of FIG. 1. Analysis prosumers 214 execute non-linear tasks based on information 210 and/or data 207, to produce "knowledge" results 216. Knowledge 216 flows to targeted applications/solutions 220 that may also be hosted in a data center and that use the knowledge to make informed business decisions.

In a pictorial form, data model 204 shows data 207, information 210, knowledge 216, and wisdom 222 (derived from knowledge 216) layered from bottom-to-top in an order of less important to more important from the perspective of prosumers 212/214 and targeted solutions 220. Data 207 is deemed less important because of its relatively large volume/size and heterogeneity. Data 207 and information 210 are demarcated by the approximately linear tasks performed at edge devices 208, while information 210 and knowledge 216 are demarcated by the non-linear tasks performed at prosumers 214. Collectively, data 207 and information 210 represent "data in motion" or "data in transit," while knowledge 216 and wisdom 222 represent "data at rest."

Figure 3:
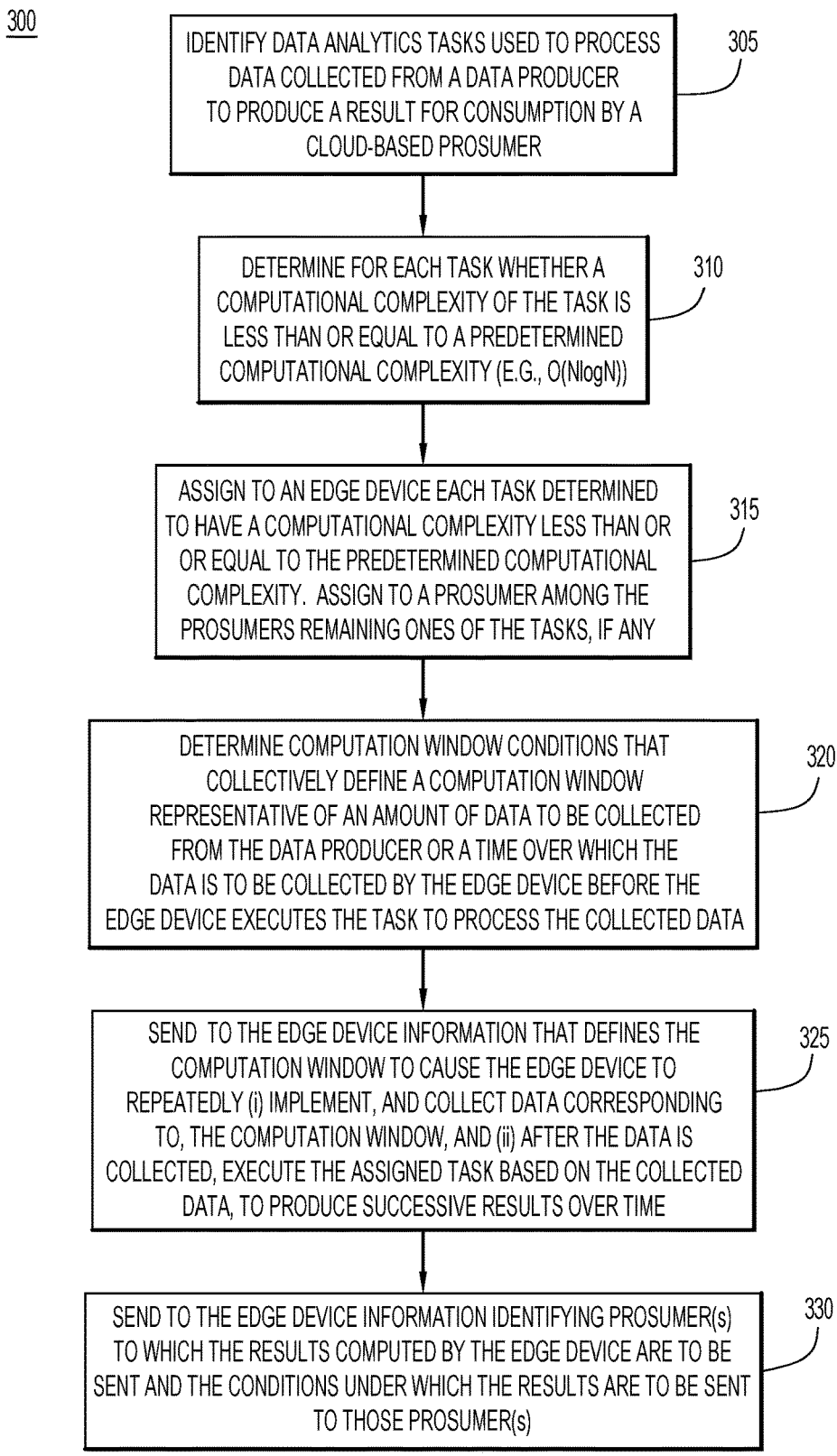
FIG. 3 is a flowchart of a method of controlling data analytics in a hierarchical network performed by a network controller, according to an example embodiment.

With reference to FIG. 3, there is a flowchart of an example method 300 of controlling data analytics in a hierarchical network. Operations 305-330 of method 300 may all be performed by controller 108 or, alternatively, the operations may be shared across the controller and other devices in network 100, such as edge device 104 and/or one or more of prosumers 106. In an embodiment, method 300 assumes that controller 108 has access to a database of data analytics information as depicted in FIG. 7.

With reference to FIG. 7, there is an illustration of an example data analytics database 700 that may be stored in network 100 and accessible to controller 108. The information in database 700 may be centralized at a single device or distributed across multiple devices of network 100. Database 700 includes: a first column 705 that lists existing data analytics tasks 1-M by name or other identifier; a second column 710 that provides links or pointers to the tasks (e.g., to a computer program that implements the task) identified in column 705; a third column 715 that lists predetermined orders of complexities of the tasks identified in column 705; and an optional fourth column 720 that may include specific policy, rules, and/or conditions that apply to the tasks identified in column 705, for example, a maximum expected time between successive executions of (and thus time between results produce by) the identified task, a minimum amount of data to be used in each execution of the task, or other predetermined computation window conditions, for example. Data analytics tasks 1-M may be pre-deployed in edge device 104 and in prosumers 106, in which case database 700. Alternatively, the data analytics tasks may need to be downloaded to edge device 104 and prosumers 106 by controller 108. Thus, database 700 may include further information defining whether and where each task identified in column 705 is deployed in network 100. Database 700 may also include network address, e.g., IP addresses, of edge device 104 and prosumers 106.

FIG. 3 is now described also with continued reference to FIGS. 1 and 7. At 305, controller 108 identifies data analytics tasks used to process data collected from a data producer (e.g., one or more of data producers 102 and/or 206) to produce a result for consumption by one or more prosumers (e.g., prosumers 106, 212, and/or 214). Controller 108 may access database 700 to identify the data analytics tasks, or edge device 104 or one or prosumers 106 may inform controller 108 of the relevant data analytics tasks.

At 310, controller 108 determines a computational complexity of each task identified at 305, and whether the computational complexity is less than or equal to a predetermined computational complexity. Controller 108 may access the computational complexities from database 700 or may compute the computational complexity using any known or hereafter developed technique for computing the computational complexity of the task. The predetermined computational complexity may be proportional to O(logN), e.g., O(NlogN), O(MlogN), and so on, although other predetermined computational complexities may be used.

At 315, controller 108 assigns to edge device 104 each task determined to have a computational complexity less than or equal to the predetermined computational complexity. Also, controller 108 assigns to the one or more of prosumers any remaining ones of the tasks, if any, i.e., each task determined to have a computational task that exceeds the predetermined computational complexity. Controller 108 may send messages to the edge device and the prosumers identifying the respective tasks assigned thereto. The result of assigning the tasks is that edge device 104 and the prosumer(s) 106 will execute the assigned tasks, i.e., the assignments cause the edge device and prosumers to execute the tasks assigned thereto. The tasks may already be provisioned on edge device 104 and prosumer(s) 106. If not, controller 108 may access the tasks via database 700 and download the assigned tasks to edge device 104 and prosumer(s) 106.

At 320, controller 108 establishes a computation window for each task assigned to edge device 104. The computation window represents/defines an amount of data (e.g., number of data samples) that is to be collected for the task, or a time over which the data is to be collected for the task, before the edge device executes the task based on the collected data. The computation window ensures that, each time the task is executed by edge device 104, the executed task processes a sufficiently large amount of data (collected from the data producer) to ensure useful results/information are generated by the executed task. To establish the computation window, controller 108 determines multiple computation window conditions that collectively define the computation window. Controller 108 may derive one or more of the computation window conditions analytical and/or access the one or more of the computation window conditions from column 720 of database 700. The computation window conditions are described below in connection with FIG. 4.

Also at 320, controller 108 may determine a size of the computation window (e.g., an amount of data to be collected in the computation window, or a time over which the computation window extends) based on one or more of the computation window conditions from operation 315. For example, controller may select the size of the computation window that satisfies one, and preferably multiple ones, of the computation window conditions.

At 325, controller 108 sends to edge device 104 information that defines the computation window to cause the edge device to repeatedly (i) implement, and collect from the data producer data corresponding to, the computation window, and (ii) after the data is collected, execute the assigned task based on the collected data, to produce successive results over time. The information sent to edge device 104 may include (i) a size of the computation window if controller 108 determined the size at 320, (ii) the computation window conditions so that the edge device may select a size of the computation window based on the information, or (iii) a combination of both (i) and (ii).

At 330, controller 108 sends to edge device 104 information identifying one or more of the prosumers to which the results flowing from execution of each task assigned to the edge device are to be sent, and any conditions under which the results are to be sent to those prosumers. The information identifying prosumers may include IP addresses of the prosumers. This results in a controlled distribution of data and results from the edge device to the prosumers. The distribution of data and results and may be as a multiplexed stream. The effect is to manage the type of information sent to the prosumers and reduce the volume of that information sent to the prosumers compared to a situation in which the tasks performed at the edge device were pushed to the prosumers instead.

The information sent by controller 108 to the edge device in operations 315 and 325 represents a set of policy, rules, and conditions that define "what tasks are computed where and what results (of the tasks) are to be sent where."

Information send from controller 108 to edge device 104 and prosumers 106 in method 300 may be in a form of IP packets or any other type of data message conveyable over network 100.

Figure 4:
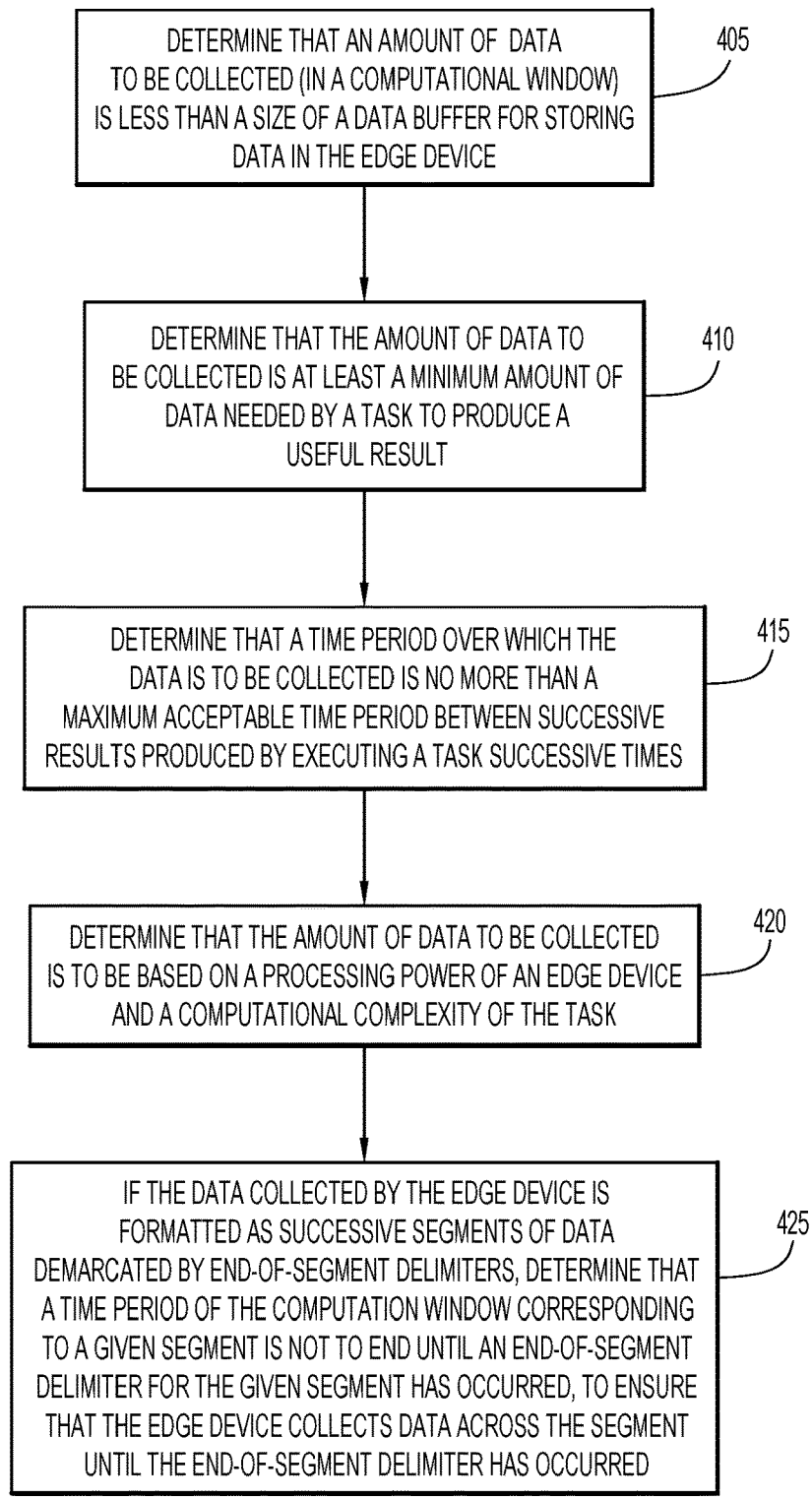
FIG. 4 is a flowchart of operations expanding on a computation window operation of the method of FIG. 3, according to an example embodiment.

With reference to FIG. 4, there example operations 400 expanding on computation window operation 320 of method 300. Operations 400 determine computation window conditions that collectively define the computation window to be implemented at edge device 104.

At 405, controller 108 determines that an amount of data to be collected (in a computational window) is less than a size of a data buffer for storing data in the edge device. In an example, edge device 104 may report its buffer size to controller 108 responsive to a request for that information from controller 108.

At 410, controller 108 determines that the amount of data to be collected is at least a minimum amount of data needed by the task to produce a useful result.

At 415, controller 108 determines that a time period over which the data is to be collected is no more than a maximum acceptable time period between successive results produced by executing a task a successive number of times. Maximum acceptable time periods for different tasks may be stored in column 720 of database 700 to be accessible to controller 108.

At 420, controller 108 determines that the amount of data to be collected is to be based on a processing power of an edge device and a computational complexity of the task. In an example, edge device 104 may report its processor availability (e.g., percentage of processing time allocated to the task over a given period of time) and processor speed to controller 108, and the controller may determine the processing power based on the processor availability and speed using any known or hereafter developed technique used to determine processing power.

At 425, if the data collected by the edge device is formatted as successive segments of data demarcated by end-of-segment delimiters, controller 108 determines, as a condition for the computation window, waiting until an end-of-segment delimiter for a given segment has occurred before ending the computation window for the given segment, to ensure that the edge device collects data across the segment until the end-of-segment delimiter has occurred. Application of this condition means that a time period of the computation window corresponding to the given segment will not end until an end-of-segment delimiter for the given segment has occurred.

A size of the computation window may be determined/selected by controller 108 or edge device 104 based on one or more of the computation window conditions. For example, the computation window size (in terms of an amount of data or a time period) may be selected to be (i) less than the buffer size of edge device 104, (ii) greater the minimum amount of data for needed for a useful result, and (iii) extended to wait for an end-of-block delimiter (a condition which is applied at edge device 104, since the edge device receives the end-of-block delimiter).

Examples that use the operations of method 300 and operations 400 are now described. In an image filtering example, data producer 102 includes a video camera which provides compressed video in the Joint Photographic Experts Group (JPEG) format to edge device 104. The JPEG format encodes Discrete Cosine Transform (DCT) coefficients. In general, a computational complexity of decoding the JPEG format (i.e., decoding JPEG formatted data) is non-linear, i.e., exceeds $O(Nlog(N))$, as the JPEG format is based on the DCT. Many image filtering algorithms transform/decode a JPEG image into a pixel space. Given the high complexity of the decoding, the JPEG image is typically sent to a cloud-based prosumer to be decoded (and analyzed). Overall, the decoding complexity is based on N DCT streams with some number of DCT coefficients, which is matched to image resolution; however, in decoding or stream decompression algorithms that use lookup indices or lookup tables, where such indices or tables are pre-computed and included in metadata in the stream itself, the complexity of decoding or decompressing can fall below $O(Nlog(N))$ and thus computation can be performed at the edge device.

Having said this, a task may be constructed to perform limited image filtering (or pre-filtering) based on preset DCT signatures. The complexity of such limited image filtering may be less than $O(Nlog(M))$, and thus edge device 104 may perform the task. An example of such filtering include pattern matching M known DCT signatures in N DCT segments (assuming a computation window over an image/video can handle the N DCT segments). This yields a complexity $O(Nlog(M))$, suitable for edge device 104.

Continuing with this example, controller 108 determines a "policy" to govern the manner in which the filtering task will be implemented, which includes the computation window conditions. Controller 108 performs the following:

a. Assesses the edge device computational ability, e.g., processor speed (already known);
  b. Assesses the edge device processor availability (e.g., from network management tools available in network 100);
  c. Determines processor power based on computational ability and availability;
  d. Determines that the image pre-filtering has complexity $Nlog(M)$, where N is the number of DCT coefficients on which to pattern match and M is the number of patterns, e.g., stored in an array);
  e. Computes a computation window size (elastic) to based on the processor power and other computation window conditions:
      i. Selects all M known patterns of the DCT coefficients; and
      ii. Selects a computation window size of 5 JPEG frames from a video stream from the video camera, or selects a 10 MB size (e.g., buffer size);
  f. Sends to the edge device the above-determined conditions/information;
  g. Sends to the edge device information identifying which prosumers are to be sent which results (of the pre-filtering) based on which result conditions (e.g., if positive result, send content to prosumer A and B, if negative result, send content to prosumer B;
  h. The edge device pre-filters on M patterns, if positive result, it sends content (e.g., pre-filtering results and JPEG frames) to prosumer A and B, if negative result, it sends content to prosumer B;
  i. For this use case: Prosumer A is assigned the task to analyze the JPEG frames for facial recognition.
  j. At the prosumers, the output of facial recognition produces additional adjustments to patterns, which adjustments are sent back to the edge device via controller 108 (or directly); and
  k. For this use case, prosumer B archives the JPEG frames for future reference.

In the above example, (a)-(e) may be performed as part of operation 420, described in connection with FIG. 4.

The above example can be generalized as a mathematical/computational task that is able to be decomposed into a series of linear and/or non-linear tasks. For example, a Fourier Transform, or inverse Transform (or any transform) may be represented as the following series of steps:

a. New value=SUM(Some Transform T—OR—a table lookup to approximate T's linearization) over some 0-Limit;
  b. Only operate on several initial coefficients of the series to the limit of the available resources of the edge device, e.g., 5 coefficients;
  c. In this decomposition, $log(M)$ reflects the complexity of a table lookup; and
  d. N is the number of entries to process we define in an arbitrary set computation window.

Another example relates to electrical power monitoring, in which data producer 102 includes current and voltage sensors that send periodic current and voltage measurements to edge device 104. Controller 108 assigns to edge device 104 tasks to compute an average current, an average voltage, and an average power. Controller 108 also determines as one of the compute window conditions a (minimum) sample size of measurements (a minimum amount of data) that must be collected over the compute window to determine useful/valid/meaningful averages. At operation 410 described above, controller 108 may determine the minimum required sample size using known statistical analysis that takes into account a required degree of confidence/margin of error (and thus Z-score) and a selected level of variance (standard deviation). For example, the sample size may be computed based on the following equation:

Sample Size=Z-score*Standard Deviation*(1-Standard Deviation)/Margin of Error.

Figure 5:
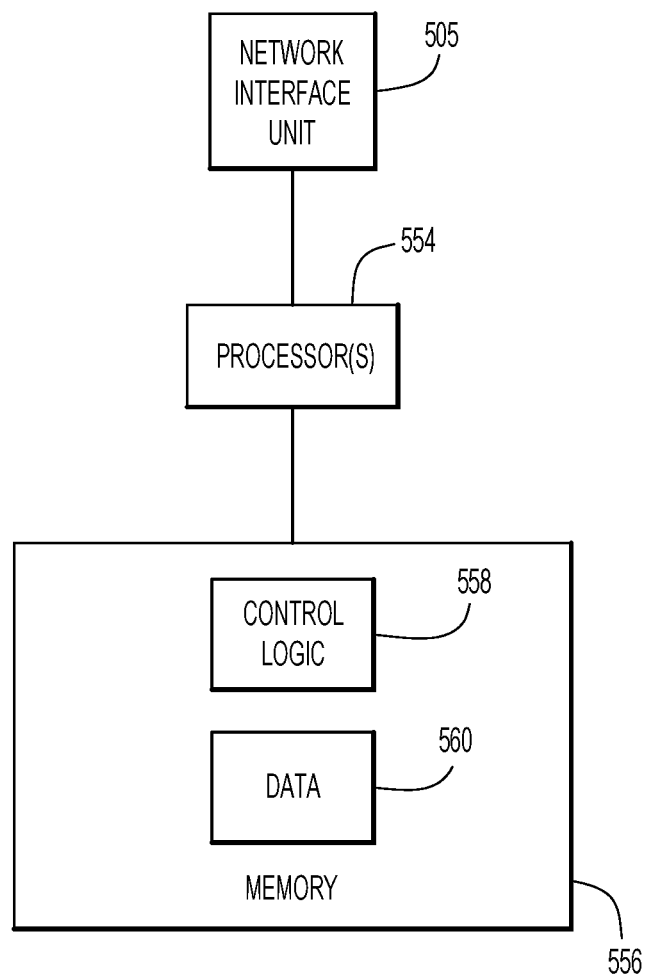
FIG. 5 is a block diagram of the network controller, according to an embodiment according to an example embodiment.

With reference to FIG. 5, there is a block diagram of network controller 108, according to an embodiment. Controller 108 includes network interface unit 505 to communicate with a wired and/or wireless communication network so as to communicate with edge device 104 and prosumers 106, a processor 554 (or multiple processors, which may be implemented as software or hardware processors), and memory 556. Network interface unit 505 may include an Ethernet card (or multiple such devices) to communicate over wired Ethernet links and/or a wireless communication card to communicate over wireless links.

Memory 556 stores instructions for implementing methods described herein. Memory 556 may include read only memory (ROM), random access memory (RAM), magnetic disk storage media devices, optical storage media devices, flash memory devices, electrical, optical, or other physical/tangible (non-transitory) memory storage devices. The processor 554 is, for example, a microprocessor or a microcontroller that executes instructions stored in memory. Thus, in general, the memory 556 may comprise one or more tangible computer readable storage media (e.g., a memory device) encoded with software comprising computer executable instructions and when the software is executed (by the processor 554) it is operable to perform the operations described herein. Memory 556 stores control logic 558 to perform operations of controller 108 described herein, so as to implement method 300 and operations 400, for example. The memory 556 may also store data 560 used and generated by logic 558, such as task database 700.

Figure 6:
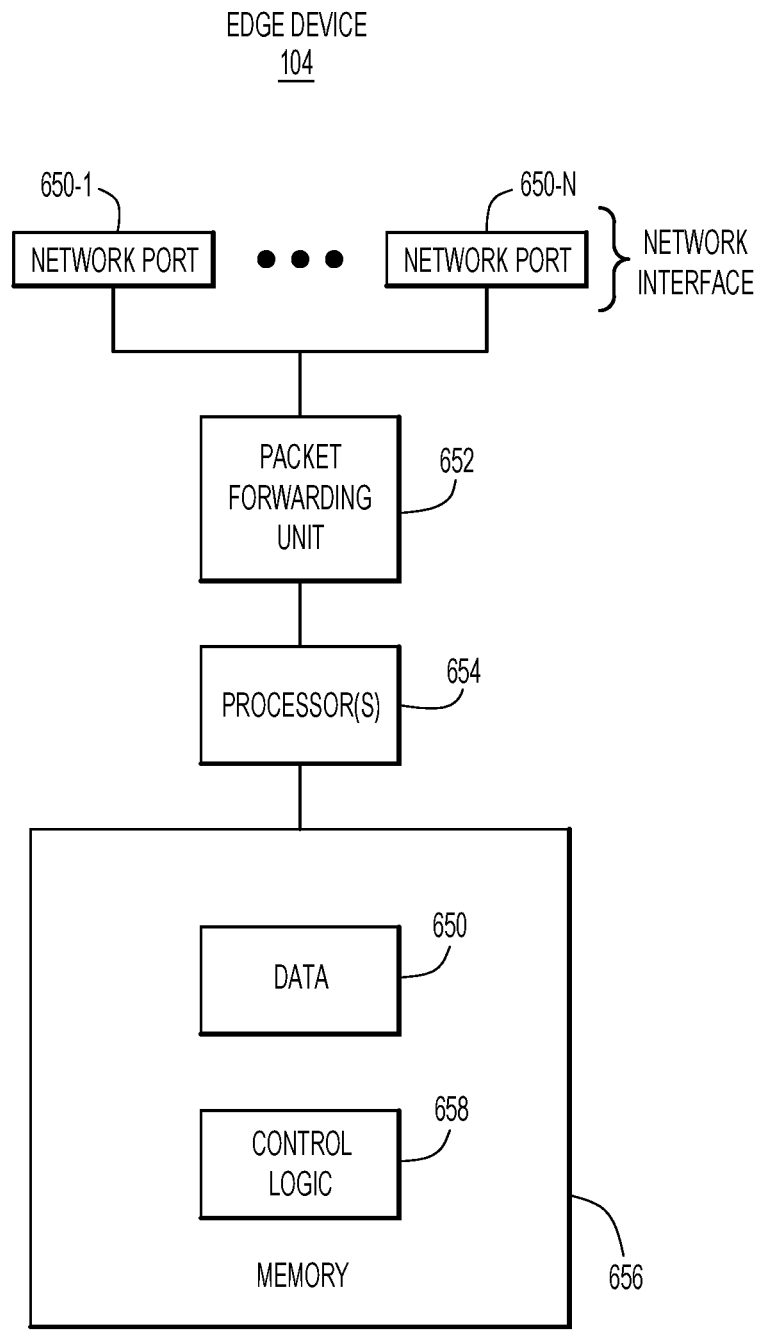
FIG. 6 is a block diagram of an edge device in the hierarchical network, according to an example embodiment.

With reference to FIG. 6, there is a block diagram of edge device 104, such as a network router or switch, according to an embodiment. Edge device 104 may include a plurality of wired and/or wireless network ports 650-1 through 650-N or other form of network interface to communicate with wired and/or wireless communication networks, a packet forwarding unit 652 having forward tables used to make packet forwarding decisions, a processor 654 (or multiple processors) and memory 656. The memory 656 stores instructions for implementing methods described herein.

The memory 656 may comprise read only memory (ROM), random access memory (RAM), magnetic disk storage media devices, optical storage media devices, flash memory devices, electrical, optical, or other physical/tangible (non-transitory) memory storage devices. The processor 654 is, for example, a microprocessor or a microcontroller that executes instructions stored in memory. Thus, in general, the memory 656 may comprise one or more tangible computer readable storage media (e.g., a memory device) encoded with software comprising computer executable instructions and when the software is executed (by the processor 654) it is operable to perform the operations described herein. Memory 656 stores control logic 658 to perform edge device operations described herein, such as edge device operations associated with method 300 and operations 400. Such operations include collecting data according to a computation window, executing tasks (assigned to edge device 104) based on the collected data, and sending results produced by the executed tasks to prosumers 106. Control logic 658 also includes tasks assigned to edge device 104 by controller 108. The memory may also store data 660 used and generated by logic 658.

In summary, a divide and conquer approach is used to distribute data analytics (tasks) among devices in a hierarchical network. The divide and conquer approach delineates between linear complexity computational tasks to the network edge (i.e., to edge devices, such as gateway devices) and non-linear complexity computational tasks to the cloud. A linear complexity at the edge provides an ideal alignment of computational cost to the Input-Output (IO) of the edge device where the processor complexity is at worst NlogN (most of the time N) and the IO is of the order N. Mixing cloud and edge computing in this manner is an optimal solution based on underlying use cases. Embodiments described herein address the problem of what tasks should be performed in the cloud and what tasks should reside at the edge. An example use case is the overarching data analytics for IoT.

Traditionally, the cloud rarely interacted with the edge at the intelligent level. Delegation of roles and functions to the edge described herein transforms the edge to a prosumer of what is delegated, and divides the tasks of data analytics between the edge and the cloud. The logical statement of "what to compute where" does not reflect a taxonomical representation of the data and where to process the data, but instead, the computations follow their mathematical complexity and the data on which the computations operate.

In addition, embodiments described herein classify data in different ways. Data may be the stream aggregates of payload from serial, L2, or L3-L6, flows. Data sources represent the contextualization of the data tied to actual physical sources. Also, embodiments described herein classify data as either simple or complex reflecting the number of independent variables attached to a time index, where time is a function of a packet stream, such as an L3 network stream. For example, a temperature read is a single read over time, whereas a camera presents a two dimensional projection (or more in some cases) and thus provides a complex data type. Another type of complex sensor is an acoustic sensor used in mining, oil and gas operations.

Advantages of the embodiments presented herein include reducing the cost of IoT analytics solutions and separating edge computations from cloud computations. The edge complexity and compute hardware (cost reduction) is thus predicable because it is of the order of the IO of the edge.

In summary, in one form, a method is provided comprising: at a network controller in a network including edge devices to collect data from data producers connected to the edge devices and to communicate with cloud-based prosumers hosted on computers and connected with the edge devices: identifying data analytics tasks used to process data collected from a data producer among the data producers to produce respective results for consumption by one or more of the cloud-based prosumers; determining for each data analytics task a respective computational complexity and whether the computational complexity is less than or equal to a predetermined computational complexity; assigning to an edge device among the edge devices each data analytics task determined to have a computational complexity less than or equal to the predetermined computational complexity; and assigning to a prosumer among the prosumers each data analytics task determined to have a computational complexity that exceeds the predetermined computational complexity, if any.

In another form, an apparatus is provided comprising: a network interface to communicate with (i) edge devices of a network that are configured to collect data from data producers connected to the edge devices, and (ii) cloud-based prosumers hosted on computers and connected with the edge devices over the network; a processor coupled with the network interface and configured to: identify data analytics tasks used to process data collected from a data producer among the data producers to produce respective results for consumption by one or more of the cloud-based prosumers; determine for each data analytics task a respective computational complexity and whether the computational complexity is less than or equal to a predetermined computational complexity; assign to an edge device among the edge devices each data analytics task determined to have a computational complexity less than or equal to the predetermined computational complexity; and assign to a prosumer among the prosumers each data analytics task determined to have a computational complexity that exceeds the predetermined computational complexity, if any.

In yet another form, a non-transitory computer readable storage media encoded with instructions is provided. When executed by a processor, the instructions cause the processor to: identify data analytics tasks used to process data collected from a data producer among the data producers to produce respective results for consumption by one or more of the cloud-based prosumers; determine for each data analytics task a respective computational complexity and whether the computational complexity is less than or equal to a predetermined computational complexity; assign to an edge device among the edge devices each data analytics task determined to have a computational complexity less than or equal to the predetermined computational complexity; and assign to a prosumer among the prosumers each data analytics task determined to have a computational complexity that exceeds the predetermined computational complexity, if any.

The above description is intended by way of example only.

What is claimed is:

1. A computer implemented method, comprising:
   at a network controller in a network including edge devices to collect data from data producers connected to the edge devices and to communicate with cloud-based prosumers hosted on computers and connected with the edge devices:
   identifying data analytics tasks used to process data collected from a data producer among the data producers to produce respective results for consumption by one or more of the cloud-based prosumers;
   determining for each data analytics task a respective computational complexity and whether the computational complexity is less than or equal to a predetermined computational complexity;
   assigning to an edge device among the edge devices each data analytics task determined to have a computational complexity less than or equal to the predetermined computational complexity, and for each data analytics task assigned to the edge device:
   determining computation window conditions that collectively define an amount of data to be collected from the data producer by the edge device before the edge device executes the data analytics task on the collected data; and
   communicating to the edge device information based on the computation window conditions to cause the edge device to repeatedly (i) collect the amount of data, and (ii) after the amount of data is collected, execute the data analytics task based on the amount of data, to produce successive results; and
   assigning to a prosumer among the prosumers each data analytics task determined to have a computational complexity that exceeds the predetermined computational complexity.

2. The method of claim 1, wherein the predetermined computational complexity is proportional to a computational complexity of order $N\log(N)$ where N represents a number of values operated on by a given data analytics task.

3. The method of claim 2, wherein the prosumer has more compute power than the edge device.

4. The method of claim 1, wherein the determining computation window conditions includes:
   determining a first computation window condition that the amount of data to be collected does not exceed a size of a data buffer for storing the data in the edge device; and
   determining a second computation window condition that a time period over which the amount of data is to be collected does not exceed a maximum acceptable time period between successive results produced by executing the data analytics task successive times.

5. The method of claim 4, wherein the determining computation window conditions further includes determining a third computation condition that the amount of data to be collected is at least a minimum amount of data.

6. The method of claim 4, wherein the determining computation window conditions further includes:
   determining a processing power of the edge device based on an availability and a computational ability of a processor of the edge device;
   determining the amount of data based on the processing power and the computational complexity of the data analytics task.

7. The method of claim 4, wherein:
   the data collected by the edge device is formatted as successive segments of data demarcated by end-of-segment delimiters; and
   the determining the conditions further includes determining a third condition that includes waiting until an end-of-segment delimiter for a given segment has occurred for the given segment, to ensure that the edge device collects data across the segment until the end-of-segment delimiter has occurred.

8. The method of claim 1, further comprising:
   commanding the edge device to send results of executing the assigned data analytics task at the edge device to one or more of the cloud-based prosumers.

9. The method of claim 8, further comprising:
   commanding the edge device to send results of executing the assigned data analytics task at the edge to different cloud-based prosumers based on different conditions of the results.

10. An apparatus, comprising:
    a network interface to communicate with (i) edge devices of a network that are configured to collect data from data producers connected to the edge devices, and (ii) cloud-based prosumers hosted on computers and connected with the edge devices over the network;
    a processor coupled with the network interface and configured to:

identify data analytics tasks used to process data collected from a data producer among the data producers to produce respective results for consumption by one or more of the cloud-based prosumers;
determine for each data analytics task a respective computational complexity and whether the computational complexity is less than or equal to a predetermined computational complexity;
assign to an edge device among the edge devices each data analytics task determined to have a computational complexity less than or equal to the predetermined computational complexity, and for each data analytics task assigned to the edge device:
   determine computation window conditions that collectively define an amount of data to be collected from the data producer by the edge device before the edge device executes the data analytics task on the collected data; and
   communicate to the edge device information based on the computation window conditions to cause the edge device to repeatedly (i) collect the amount of data, and (ii) after the amount of data is collected, execute the data analytics task based on the amount of data, to produce successive results; and
assign to a prosumer among the prosumers each data analytics task determined to have a computational complexity that exceeds the predetermined computational complexity.

11. The apparatus of claim 10, wherein the predetermined computational complexity is proportional to a computational complexity of order Nlog(N) where N represents a number of values operated on by a given data analytics task.

12. The apparatus of claim 11, wherein the prosumer has more compute power than the edge device.

13. The apparatus of claim 10, wherein the processor is configured to determine computation window conditions by:
   determining a first computation window condition that the amount of data to be collected does not exceed a size of a data buffer for storing the data in the edge device; and
   determining a second computation window condition that a time period over which the amount of data is to be collected does not exceed a maximum acceptable time period between successive results produced by executing the data analytics task successive times.

14. The apparatus of claim 13, wherein the processor is further configured to determine the computation window conditions by determining a third computation condition that the amount of data to be collected is at least a minimum amount of data.

15. The apparatus of claim 13, wherein:
   the data collected by the edge device is formatted as successive segments of data demarcated by end-of-segment delimiters; and
   the processor is further configured to determine the computation window conditions by determining a third condition that includes waiting until an end-of-segment delimiter for a given segment has occurred for the given segment, to ensure that the edge device collects data across the segment until the end-of-segment delimiter has occurred.

16. A non-transitory computer readable storage media encoded with instructions that, when executed by a processor, cause the processor to:
   identify data analytics tasks used to process data collected from a data producer among the data producers to produce respective results for consumption by one or more of the cloud-based prosumers;
   determine for each data analytics task a respective computational complexity and whether the computational complexity is less than or equal to a predetermined computational complexity;
   assign to an edge device among the edge devices each data analytics task determined to have a computational complexity less than or equal to the predetermined computational complexity, and for each data analytics task assigned to the edge device:
      determine computation window conditions that collectively define an amount of data to be collected from the data producer by the edge device before the edge device executes the data analytics task on the collected data; and
      communicate to the edge device information based on the computation window conditions to cause the edge device to repeatedly (i) collect the amount of data, and (ii) after the amount of data is collected, execute the data analytics task based on the amount of data, to produce successive results; and
   assign to a prosumer among the prosumers each data analytics task determined to have a computational complexity that exceeds the predetermined computational complexity.

17. The computer readable storage media of claim 16, wherein the predetermined computational complexity is proportional to a computational complexity of order Nlog(N) where N represents a number of values operated on by a given data analytics task.

18. The computer readable storage media of claim 17, wherein the prosumer has more compute power than the edge device.

19. The computer readable storage media of claim 16, wherein the instructions to cause the processor to determine the computation window conditions include instructions to cause the processor to:
   determine a first computation window condition that the amount of data to be collected does not exceed a size of a data buffer for storing the data in the edge device; and
   determine a second computation window condition that a time period over which the amount of data is to be collected does not exceed a maximum acceptable time period between successive results produced by executing the data analytics task successive times.

20. The computer readable storage media of claim 19, the instructions to cause the processor to determine the computation window conditions include further instructions to cause the processor to determine a third computation condition that the amount of data to be collected is at least a minimum amount of data.

* * * * *